United States Patent Office 2,768,190
Patented Oct. 23, 1956

2,768,190

PREPARATION OF 3-ACETOXY-$\Delta^{16}$-ALLOPREGNEN-20-ONE FROM DIACETYLTOMATIDINE

Richard Kuhn and Irmentraut Löw, Heidelberg, Germany, assignors, by mesne assignments, to American Home Products Corporation, New York, N. Y., a corporation of Delaware No Drawing. Application October 7, 1952,
Serial No. 313,594

1 Claim. (Cl. 260—397.4)

This invention relates to the preparation of valuable steroid compounds. More particularly, it relates to the preparation of 3-acyloxy-$\Delta^{16}$-allopregnen-20-ones starting with the alkaloidal glucoside tomatine.

From the alkaloidal glucoside tomatine, which occurs in large amounts in certain varieties of tomato, especially in the leaves of tomato plants, diacetyltomatidines have previously been prepared. For example, by treating tomatine with pyridin and acetic anhydride at room temperature, or by the introduction of ketene for several hours into a benzene solution of tomatine, diacetyltomatidine ($C_{31}H_{49}O_4N$, melting point 194° C.), is obtained.

It has now been found that the diacyltomatidines can be converted to diacyl-pseudotomatidines by heating with acid or by intensive irradiation with light. From these products the corresponding 3-acyloxy-$\Delta^{16}$-allopregnen-20-ones can be recovered by oxidation.

By treating of diacetyltomatidine (melting point 194° C.), by prolonged heating with glacial acetic acid, or by irradiation, either by means of strong incandescent lamp, the light from a lamp yielding ultraviolet irradiation, or by direct sunlight, the product diacetyl-pseudotomatidine is secured. Oxidation of diacetyl-pseudotomatidine with an oxidzing agent such as chromic anhydride $CrO_3$, or with hydrogen peroxide in the presence of a catalyst such as vanadium pentoxide, results in 3-acetoxy-$\Delta^{16}$- allopregnen-20-one.

The new products, 3-acyloxy-$\Delta^{16}$-allopregnen-20-ones, are useful in pharmacy and in the cosmetic industry.

As illustrative of our improved process, the following examples may be given:

Example 1

Diacetyltomatidine in the amount of 3 parts by weight was boiled under a reflux condenser with 100 parts by volume of pure glacial acetic acid for five hours. Two other samples of diacetyltomatidine in glacial acetic acid were irradiated at room temperature for six hours with the light from a 300 watt lamp; and subjected, at room temperature, to the action of direct sunlight for six hours.

The resulting product in glacial acetic acid, regardless of the mode of preparation, was evaporated to dryness in a vacuum to drive off the acid. The residue was then taken up in ether, and the ethereal solution evaporated. The half-solid, syrupy raw product was chromatographed in benzene on $Al_2O_3$ (prepared as described by Brockmann, inactivated with methanol). By elution with a mixture of benzene and methanol (9 parts by volume of benzene to 1 part by volume of methanol), pure diacetyl-pseudotomatidine was secured as a colorless amorphous compound melting at 90–92° C. Its boiling point was 270–280° C. (at 0.001 millimeter of mercury pressure). The yield was 90%.

Diacetyl-pseudotomatidine in the amount of 2 parts by weight was dissolved in 100 parts by volume of 96% glacial acetic acid. Simultaneously this solution, along with a solution of 0.8 part by weight of $CrO_3$ in 100 parts by volume of 96% glacial acetic acid, were both allowed to flow into 100 parts by weight of glacial acetic acid heated to 60°–70° C., the mixture being agitated during the period of 10 minutes required for the mixing. The mixture was then stirred for one additional hour at 60°–70° C., diluted with water, and extracted with ether. The ether extract was washed first with dilute caustic soda solution, and then with water. It was dried over sodium sulfate, $Na_2SO_4$, and then evaporated.

A solidified oil foam in the amount of 2 parts was obtained. This was chromatographed in benzene on $Al_2O_3$ (prepared according to Brockmann, inactivated with methanol). By elution first with benzene, and then with a mixture of 3 parts by volume of benzene to 1 part by volume of ether, 3-acetoxy-$\Delta^{16}$-allopregnen-20-one was obtained, the yield being 83% of the theoretical. Its melting point was 162–163° C., after sublimation at 150–160° C. at a reduced pressure equivalent to 0.001 millimeter of mercury.

Example 2

Diacetyl-pseudotomatidine in the amount of 2.2 parts by weight as obtained in accordance with the procedure described in the first two paragraphs of Example 1 was dissolved in 150 parts by volume of pure tertiary butanol and treated with 0.1 part by weight of freshly precipitated, air-dried vanadium peroxide $V_2O_5$, 25 parts by weight of sodium sulfate $Na_2SO_4$ and 50 parts by volume of hydrogen peroxide dissolved in tertiary butanol (one part by volume of this solution equals 0.051 part by weight of $H_2O_2$). The solution immediately turned yellow, but became colorless after 12 hours. It was again treated with 50 parts by volume of hydrogen peroxide solution. After a further period of 12 hours, it was treated with an additional 50 parts by volume of the hydrogen peroxide solution. After a total of 30 hours the solution was diluted with ether, and filtered to free it from sediment. The sediment was washed with ether, and the mixed butanol-ether solution was evaporated at a reduced pressure, less than atmospheric. The greasy residue was chromatographed in benzene on $Al_2O_3$ (prepared as described by Brockmann, inactivated with methanol). By elution first with benzene, and then with a benzene-ether mixture, there was obtained 3-acetoxy-$\Delta^{16}$-allopregnen-20-one. The yield of product was good.

As the oxidizing agent it is also possible to employ either potassium permanganate or osmium tetraoxide. Equally satisfactory results are secured by the use of either of these oxidizing agents.

Changes and modifications may be made in our procedure, a preferred embodiment of which is described herein, without departing from the spirit of our invention.

We claim:

The method of preparing 3-acetoxy-$\Delta^{16}$-allopregnen-20-one which comprises treating diacetyltomatidine of melting point about 194° C. with glacial acetic acid in order to convert said diacetyltomatidine to diacetyl-pseudotomatidine of melting point about 90–92° C., and then oxidizing said diacetyl-pseudotomatidine to the desired product by treatment thereof with an oxidizing agent selected from the group which consists of hydrogen peroxide and chromic acid anhydride.

References Cited in the file of this patent

UNITED STATES PATENTS 2,684,365    Mosettig et al. _____ July 20, 1954

OTHER REFERENCES

Sato et al.: JACS, 73, 880 (1951).